Sept. 24, 1974     D. E. HENNEN ET AL     3,837,988

COMPOSITE MAT

Filed Jan. 24, 1973

United States Patent Office 3,837,988
Patented Sept. 24, 1974

---

3,837,988
COMPOSITE MAT
Donald E. Hennen, Cottage Grove, and Leroy I. Kusilek, River Falls, Wis., assignors to Minnesota Mining and Manufacturing Company, St. Paul, Minn.
Continuation-in-part of application Ser. No. 83,450, Oct. 23, 1970, which is a continuation-in-part of application Ser. No. 676,497, Oct. 19, 1967, now abandoned. This application Jan. 24, 1973, Ser. No. 326,552
Int. Cl. B32b 3/06, 3/26; D04h 11/00
U.S. Cl. 161—67
10 Claims

ABSTRACT OF THE DISCLOSURE

A resilient open lofty web of interengaged coarse continuous coiled filaments, with one major surface of the web being flattened, is integrated with a bonding resin to permanently bond the filaments together to form a tough, easily-cleaned mat material which is especially useful as carpeting in damp areas. The web may also be laminated to various sheet-like substrates such as plastic film, metal or plastic screens, synthetic foam layers, and the like, to provide a dimensionally stable mat material which is especially suited for use as a floor covering.

BACKGROUND OF THE INVENTION

This application is a continuation-in-part of Ser. No. 83,450, filed Oct. 23, 1970, which in turn is a continuation-in-part of Ser. No. 676,497, filed Oct. 19, 1967, now abandoned.

This invention relates to mat materials formed of thermoplastic filaments. More particularly, the invention relates to resilient, crush-resistant, lofty webs comprised of coiled high denier continuous monofilaments that are integrated by an integrating means. The integrating means can have more than one aspect. In one aspect, the filaments of the web are coated with a bonding resin to provide an open dimensionally stable structure. In another aspect, a major surface of the web is laminated to any of a variety of sheet-like substrates. In yet another aspect of the invention, a portion adjacent one major surface of the web is partially embedded into the surface of a solid or porous flexible layer to provide a highly dimensionally stable laminate.

Carpets of numerous constructions have been used to provide wood, cement and other hard floor surfaces with a more resilient and luxuriant walking surface, and to provide thermal insulation, giving such surfaces a warmer feel. Carpets are generally comprised of a dimensionally stable base layer to which textile fibers are attached in some fashion to create a wear-resistant decorative surface. Carpet fibers are usually utilized in great numbers per unit area in order to impart the desired resilient, crush-resistant and luxuriant properties. The most resilient and luxurious carpetings will have an extremely high density of fibers, making them very expensive. Reduction of the fiber density may reduce the cost but it causes the carpeting to have a less resilient and luxuriant feel under foot and usually decreases its expected lifetime.

The above-mentioned requirements cause a serious problem in carpeting which is to be used in damp or moist areas, for example, in entry ways, around swimming pools or on locker room floors. Carpets having a high density of fibers retain moisture, causing them to have a continuous undesirable damp feeling when walked upon. They moreover can cause repugnant odors from mildew and degradation from being subjected to such prolonged moist conditions. Furthermore, although it may be desired to clean such carpetings frequently, the high density of fibers makes them very difficult to clean, the fibers tending to retain dirt as well as moisture.

The present invention provides a mat material formed of an open web of inter-engaged irregularly coiled, large-diameter filaments which provides a safe, pleasant and wear-resistant walking surface. The extremely open nature of the web and its relatively low surface area, about 10% that of conventional tufted carpeting, permits easy cleaning and washing as well as rapid drying. The large diameter filaments provide the relatively low surface area and a unique resilient, crush-resistant, luxuriant underfoot surface.

DESCRIPTION OF THE PRIOR ART

Flat ribbon-like mats have been prepared by extruding polymeric materials into large diameter filaments and flattening the filaments together with a roller, as disclosed in French Pat. No. 1,459,920, but such a product will not have the resilient nature of the web of the present invention. Non-woven webs of continuous small diameter (i.e., less than about 2 mils) filaments of thermoplastic resins are disclosed, for example, in Kinney (U.S. Pat. No. 3,341,394), Lloyd et al. (U.S. Pat. No. 3,314,840), and Vosburgh (U.S. Pat. No. 3,368,934), but such webs are more cloth-like and would not provide a web which is suitable as a carpeting material, much less a carpeting for damp areas

SUMMARY OF THE INVENTION

According to the present invention, there is provided a resilient, crush-resistant mat material suitable for use as a carpeting material, providing a unique, luxuriant floor covering surface. The mat material comprises a resilient web of large-diameter filaments of thermoplastic resin permanently integrated with a bonding resin, forming a tough unitary structure, or laminated to any of the variety of sheet-like substrates, forming a highly dimensionally stable laminate.

The web comprises an open structure of interengaged, continuous, coiled filaments of thermoplastic material having one of its major surfaces flattened, and is characterized by having a higher density of filaments adjacent the flattened surface than within its remaining structure. Prior to integration, the filaments are removably welded together at points of mutual contact.

The term "removably welded," used to describe the nature of the bond between filaments, denotes that while the welds are sufficient to permit handling of the web as an integral structure, they are sufficiently weak to permit removal of a single filament without gross damage thereto.

DESCRIPTION OF THE DRAWING

The many advantages and features of the present invention can best be understood and appreciated by reference to the accompanying drawing and wherein.

DETAILED DESCRIPTION OF THE INVENTION

The web is prepared by extruding a molten polymer in the form of a bundle of free-flowing thick filaments which progresses downwardly into glancing contact with a contact surface of a smooth plate or roll and into a quench bath. The contact surface is maintained just above the surface of the quench bath so that filaments will make glancing contact with it and thereafter fall into the quench bath. The filament bundle is aligned to permit some of the outer filaments to make such contact with the contacting surface and the remaining filaments in the bundle to fall directly into the quench bath, thereby providing a differential quenching which imparts the unique structural properties to the web. The web is advanced at a slower rate of speed than the extrusion rate, causing the quenched portion of the bundle to continuously support the incoming portion. As a result there is produced a novel filamentous web having a flattened surface and a highly expanded lofty open structure.

Figure 1:
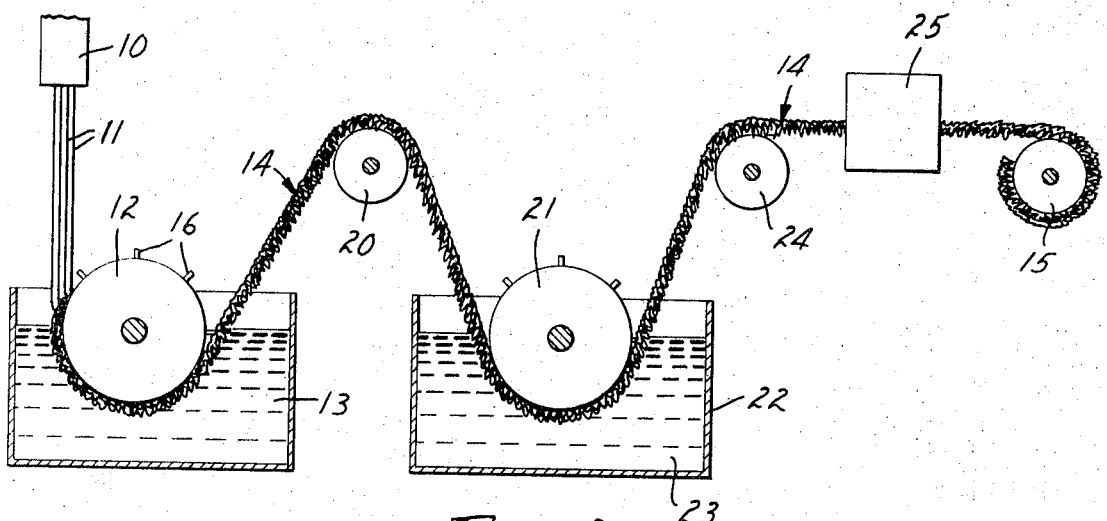
FIG. 1 is a schematic illustration in elevation showing the process and apparatus used in making and integrating the web according to the invention.
Figure 2:
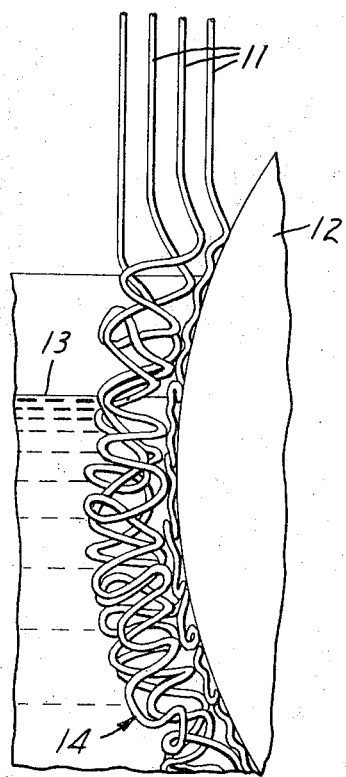
FIG. 2 is an enlarged detail view of a portion of FIG. 1 illustrating an integral aspect of the process.

In a typical preparation, as shown in FIG. 1, liquid fused polymer is extruded from a perforated nozzle or spinnerette head 10 as individual streams or filaments 11 which fall freely for a short distance before advancing into the quench bath 13. As filaments enter the quench bath they cool and rigidify, thereby setting up a degree of resistance to the flow of the molten streams which as a consequence are caused to oscillate just above the bath surface, as illustrated in detail in FIG. 2. The resulting wavy motion establishes irregular periodic point contact between the still hot and coherent streams, causing spot welding of the filaments at those points. The outer filaments adjacent drum 12 come into contact with its smooth surface and are thereby prevented from oscillation in the direction, causing a flattened surface. The surface of the drum may be provided with spaced pins or pegs 16 or may be otherwise modified to assist in controlling the advance and/or modifying structure of web 14, but is preferably generally smooth. The drum 12 rotates at a predetermined surface speed which is substantially lower than the rate of lineal movement of the filaments. A preferred ratio of drum speed to filament speed, as measured by the ratio of web length to lengths of individual filaments contained therein, is between about 1 to 2 and about 1 to 14. The bundle of filaments is rapidly cooled and rigidified in the quench bath to form integrated web 14, which is then withdrawn from the bath.

It should be noted that although the surface of drum 12 is wetted by immersion in the quench bath, such wetting is not essential, since stationary dry polished metal plates or the like have also been found to provide effective contact surfaces. Where danger of adhesion or otherwise induced sticking at the surface may be present, low-adhesion smooth coatings or films may be applied to the contact surface.

The amount of bonding or spot welding occurring during the process just described may be adjusted by changes in the particular polymer employed, the temperature of the filament at point of contact, the diameter of the filament, the rate of withdrawal of the web, and in other ways. The additional number of contacts between filaments occasioned by contact with the smoothing plate or roll adds sufficient bonding to maintain adequate integrity and good handling characteristics in the web while still permitting the removal of individual filaments in substantially continuous lengths without breakage.

Figure 3:
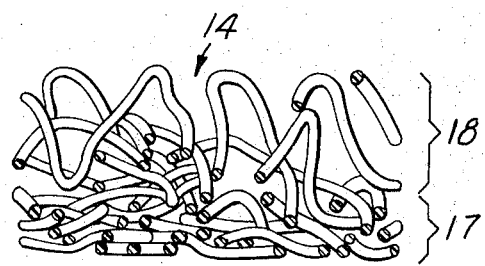
FIG. 3 is an enlarged detail view illustrating the three dimensional arrangement of filaments in a narrow segment of a typical web as made on the apparatus and by the process of FIG. 1.

The flattened surface of the web contains a higher concentration or density of filament than does the remainder of the structure, and presents a greater contact area than does the opposite unflattened surface. FIG. 3 shows a thin section taken from a typical web 14. It will be noted that the density of filaments in the lower portion 17 of the section as shown in considerably greater than that in the upper portion 18. As a result, adhesives can form a strong bond with the flattened surface, permitting the formation of highly dimensionally stable laminates with any of a variety of sheet-like substrates.

The web is integrated by treating it with a liquid hardenable adhesive bonding resin which, upon hardening, permanently adheres the filaments together as a unitary structure. This liquid may be applied by immersing the web in a bath thereof or by spraying the web therewith. Such liquids may be in the form of a solvent solution of the bonding resin, as a hot melt of the resin or in any other convenient form. Hardening of such liquids will, of course, depend upon their form. Hardening of solvent solutions will be by solvent evaporation, and hardening the melt will be by cooling.

In a typical integration treatment, illustrated in FIG. 1, the web is guided by idler rolls 20 and spiked roll 21 into a reservoir 22 containing liquid bonding resin 23, immersed therein, passed over idler roll 24, through heated chamber 25 wherein the coated web is heated to cure the binding resin, and thereafter wound on storage roll 15. Alternatively, the binder may be contained as a solution or dispersion in quench reservoir 13, thereby obviating the need for an additional reservoir therefor.

The integrated web has a high degree of dimensional and structural integrity which permits it to be used as a carpeting material in damp or wet areas. It has an open nature which permits rapid cleaning and drying. The integrated web can easily be flushed clean with a water spray.

The web can be laminated to any of a variety of sheet-like substrates to form a laminated mat structure which not only has the resilient properties of the web alone but also has an unusually high degree of dimensional stability. For this purpose the web may or may not be integrated with a bonding agent as described above. Lamination may be accomplished by adhesively attaching any of the variety of preformed sheet-like substrates to the preformed web with conventional adhesives. The flattened surface of the web provides an excellent contact surface because of its higher surface area due to the higher concentration of filaments.

Laminates are formed by coating the flattened web surface with liquid hardenable adhesive by any convenient means, e.g., brush, spray, or roll coating, and pressing the sheet-like substrate against the adhesive-coated surface with light or moderate pressure. Once the adhesive cures, the web and substrate become adherently bonded together, resisting delamination even under high stress use such as may be encountered by an entry way mat in a busy supermarket.

Various other substrates may be laminated to the web without using adhesives by introducing them at the contact surface in the process described above. While so introduced, the molten thermoplastic filaments will fall upon the substrate surface and, upon cooling, form an adherent bond between the substrate surface and the web. The web can be bonded to plastic screens, films and to other compatible substrates in this manner.

Figure 4:
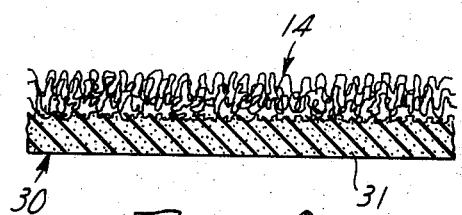
FIG. 4 is an end view of a laminated mat according to the invention.

The web can also be laminated to an open-celled or closed-cell foam or sponge layer, an illustration thereof being shown by FIG. 4 wherein laminate 30 is comprised of web 14 and foam layer 31. These layers may be applied by coating the flattened surface of the web with a sponge-producing composition or by coating such a composition on a release liner and applying the web to the coating. The sponge-producing compositions are generally viscous conformable forms which do not significantly penetrate within the web, and which cure to produce a resilient, somewhat firm foam or sponge layer. The product resulting from such an operation will be a mat structure having the web forming one surface thereof, with the flattened high filament density portion partially embedded in a foam layer which forms the opposite surface thereof.

The sheet-like substrates which may be laminated to the web as described above will for most normal uses generally vary in thickness from about 0.001 inch to about 1 inch, although other thicknesses may be suited for particular situations. These sheet-like materials may be rigid and stiff or flexible and limp, depending upon the particular properties desired.

Other embodiments of the invention are possible, each being characterized by being a composite structure of the flattened surface web described above. All of the embodiments of the invention will have the crush-resistant, resilient and luxuriant underfoot properties described above.

The polymeric materials which may be extruded to form the web include polycarbonate, polyalkylene, polyester, polyvinyl, polyamide, ionomer and other resins which are extrudable at elevated temperatures in the form of soft flexible continuous filaments and which at lower temperatures have the required stiffness and toughness to make them suited for use as a mat in damp areas, and other required physical and chemical characteristics to permit cohesion of the filaments. Particular polymers may contain plasticizers or softeners and may be otherwise modified by the addition of coloring agents, fibrous or nonfibrous reinforcing agents, stabilizers, fillers and other additives.

As may be expected, hot extruded filaments of the various polymeric materials useful in the invention are not wet with equal ease by a water quench bath, and may, therefore, require variation of certain process steps to maintain uniform operating conditions. For example, polyalkylene, polyvinyl chloride and similar polymeric materials are not as easily wet as polyester, polycarbonate, poly vinylbutyrate, and polyamide. The addition of from about 0.3 to about 5 weight percent of a wetting agent such as dioctyl sodium sulfosuccinate sold as "Triton GR–5" or octyl phenoxy polyethoxy ethanol sold as "Triton X–100" to a water quench bath improves the uniformity of wetting of such heated filaments and is generally recommended.

The width and thickness of web which may be produced by the process described above is limited, e.g. by the size of extruder and number of orifices. A typical web may contain a total of 260 filaments and have a width of eight inches and a thickness of ¾ inch. Wider web may be prepared by utilizing correspondingly larger spinnerettes or by joining two or more webs together at their edges.

Although filaments of very small as well as very large diameter may be produced and handled as herein described, webs containing filaments within the range of approximately five mils to 125 mils, or preferably 10 to 35 mils, in diameter, provide the desired high degree of resilience and crush resistance together with excellent mechanical strength to make the mat useful as a floor covering material.

The completed web may be modified prior to integration or lamination by dyeing or metallizing the filaments, or by the further addition of particulate materials such as abrasive grains, metal flakes, fibrous flock, ground cork, minute hollow glass or flexible-walled bubbles, gases or blowing agents to produce foamed filaments, etc. or by embossing, skiving, shearing, partial fusing or other physical treatment.

Example 1

The polymer employed is plasticized vinyl chloride containing 57.5% of medium molecular weight polymer and 42.5% dioctyl phthalate plasticizer together with small amounts of stabilizers and other modifiers. This polymer is commercially available under the trade designation "Geon Plastic 8813."

The polymer was extruded at a pressure of about 500 p.s.i. through an 18 inch long spinnerette having 572 0.020 inch diameter holes arranged in four equal rows spaced 0.20 inch apart. The spinnerette was heated to about 300° F. and positioned about 9 inches above the surface of a 26 inch wide, 36 inch long, 8½ inch deep water quench bath being flushed with 60–70° F. water at the rate of 1.2 gallons per minute. Dioctyl sodium sulfosuccinate wetting agent solution was pumped into the quench tank at a rate sufficient to maintain a concentration of 0.5% thereof in the quench tank. A 4 inch diameter 22 inch long spiked roll having 0.073 inch diameter ⅛ inch high cylindrical spikes spaced 1 inch apart, arranged in longitudinal rows with 1 inch between rows, with the spikes in adjacent rows staggered ½ inch, was positioned in the bath with its axis of rotation at liquid level, and was rotated at a surface speed of 10 feet per minute.

Polymer was extruded at the rate of 260 pounds per hour, producing filaments from each hole at the rate of 3.7 lineal yards per minute, forming a bundle of filaments consisting of four parallel rows. Two 500 watt quartz infra red lamps extending the length of the rows, facing opposite major surfaces of the filament bundle and positioned about 2 inches therefrom, were used to provide additional heat to attenuate the filaments.

The extrusion die was positioned with respect to the spiked roll so that one of the rows of filaments contacted the roll surface prior to being quenched, producing a lofty open 0.55 inch thick web having a flat surface and a void volume of 91%. The web weighed approximately 3 to 3½ pounds per square yard and the filaments measured about 15–20 mils in diameter.

The filaments were bonded together sufficiently so that the mat could easily be removed from the quench bath, dried and subjected to a reasonable degree of handling without filament separation. Individual filaments could be separated from the web in continuous lengths by careful hand manipulation.

The web was integrated by immersing it in a polyvinyl chloride plastisol comprised of plasticized polyvinyl chloride resin sold under the trade designation "Milligan 55514B" such that after curing by heating at about 300° F. the weight of the web had increased by 15 to 20%.

The resultant mat material served as an easily cleaned, flexible and conformable, long-lasting outdoor carpeting which was crush-resistant and resilient, providing a luxuriant underfoot walking surface.

Example 2

The web material described in Example 1 was provided with a polyvinyl chloride closed cell foam backing layer by first preparing a coatable froth vinyl plastisol mixture of the following ingredients:

| Ingredient | Generic designation | Trade designation | Parts per hundred resin |
|---|---|---|---|
| Resin | Vinyl chloride-vinyl acetate copolymer (4.5% vinyl acetate, bulk density 20 lb./cu. ft.). | "Tenneco 0565" | 80 |
| Do | Vinyl chloride-vinyl acetate copolymer (4.5% vinyl acetate, bulk density 35 lb./cu. ft.). | "Tenneco 521" | 20 |
| Filler | CaCO₃ | "Duramite 14" | 5 |
| Plasticizer | Mixed ester phthlate plasticizer. | "HS-4 plasticizer" | 75 |
| Stabilizer | Barium cadmium zinc stearate stabilizer. | "Ferro 5919" | 2 |
| Surfactant | Silicone surfactant (surfactant described in U.S. Pat. No. 3,511,788 as a 50% xylene solution). | "Dow DC-1250" | 3 |
| Fungicide | 10, 10-bis phenoxarsine (5% in epoxidized soybean oil). | "Vinyzene BP-5" | 2 |
| Pigment | Carbon black | | 2 |

The plasticizer, stabilizer and fungicide were first mixed in a mixing drum for 30 seconds to provide a homogeneous blend. Thereafter, copolymer, calcium chloride, pigment, and surfactant were each added individually with a brief mixing period after each addition. The resultant mixture was transferred to an "Oakes" foamer Model No. MB5 and foamed therein to produce a foam having a density of 21 lbs. per cu. ft. The foam was applied with a doctor blade on a releasable surface as a uniform layer 0.100 inch thick approximately 36 inches wide. A web, freshly coated with an uncured polyvinyl plastisol solution as described in Example 1, was deposited with its flat surface upon the uncured foam layer, being careful to avoid kinks, folds, creases and other discontinuities in the web. The resultant composite was passed through a 300° F. heated zone to provide a composite residence time therein of about 8 minutes, simultaneously curing the integrating plastisol solution and the foam. The resultant cured composite provided an excellent floor covering material which was crush-resistant and resilient, providing a luxuriant walking surface.

Example 3

A scrim-backed composite mat was produced by first placing a scrim formed of 1,000 denier polyethylene terephthalate filaments with 6 filaments per inch in the machine direction and 4 filaments per inch in the cross direction, the filaments being heat-bonded at points of intersection, sold under the trade designation "Stabilon" Style 421 by the Deering-Milliken Corporation, smoothly against the spiked take-up roll of the apparatus described in Example 1. Then, while otherwise following the web-producing steps described therein, permitting the take-up roll to move the scrim along the path of the formed web, and allowing the freshly extruded thermoplastic filaments to fall upon the scrim-covered spiked roll and the quench bath. The resultant scrim-backed composite mat, resembling the web described in Example 1, was dried, passed through a vinyl plastisol solution, and cured to produce an integral, dimensionally stable, porous, resilient, open structure useful as a carpet.

Example 4

The web material prepared and integrated with vinyl plastisol solution as described in Example 1 was laid into a 60-mil thick layer of uncured filled vinyl plastisol solution (available under the trade designation "GAF-tex") spread on a releasable surface. The composite structure was passed through a 320° F. oven with a residence time therein of about 8 minutes to produce a solid vinyl backing thereon. Approximately 20 mils of the flattened surface web was imbedded within the solid vinyl layer, providing a composite structure that resisted delamination which was useful as a floor mat.

Other modifications of the invention are possible without departing from the scope of the claims. For example, it is possible to flatten both web surfaces simply by including a second smooth-surfaced plate or drum in position for glancing contact with the opposite surface of the web. Such webs provide two flattened surfaces for contact with various substrates.

We claim:

1. A lofty open web of interengaged continuous crinkled coarse filaments of resilient thermoplastic polymeric material removably welded together at points of mutual contact to form a handleably integrated structure, at least one major surface of which being flattened and the portion of the mat immediately adjacent said surface containing a higher concentration of filament than the inner portion of said web, and an integrating means adherently bonded to at least a portion of said filaments of said mat to provide structural integrity to said web.

2. The mat of claim 1 wherein the filaments have a diameter of between about 5 and about 125 mils.

3. The composite mat of claim 1 wherein said integrating means is an organic resin coated over the entire structure of said web to permanently bond the filaments together.

4. The composite mat of claim 3 wherein said organic resin is plasticized polyvinyl chloride.

5. The composite mat of claim 1 wherein said integrating means is a flexible layer coextensive with and adherently bonded to the flattened surface of said web.

6. The composite mat of claim 5 wherein said organic resin layer is a sponge or foam layer with the filaments adjacent said flattened surface are partially embedded in the surface thereof.

7. The composite mat of claim 6 wherein said sponge or foam layer is formed of plasticized polyvinylchloride.

8. The composite mat of claim 5 wherein said flexible layer has a thickness in the range 0.001 to 1 inch.

9. The composite mat of claim 5 wherein said flexible layer is a solid sheet of a film-forming organic resin.

10. The composite mat of claim 5 wherein said flexible layer is a scrim.

References Cited
UNITED STATES PATENTS

| | | | |
|---|---|---|---|
| 3,533,871 | 10/1970 | Zentmyer | 161—67 |
| 3,597,297 | 8/1971 | Buchholtz et al. | 161—67 |
| 3,600,261 | 8/1971 | Kerres | 161—67 |
| 3,674,617 | 7/1972 | Mattes | 161—62 |

WILLIAM J. VAN BALEN, Primary Examiner

U.S. Cl. X.R.

156—72, 78, 167, 181; 161—159, 170; 264—168, 178 F